United States Patent
Makin et al.

(10) Patent No.: US 10,298,681 B1
(45) Date of Patent: May 21, 2019

(54) SYSTEMS AND METHODS FOR REROUTING DATA SENT BETWEEN APPLICATION CONTAINERS AND STORAGE CONTAINERS

(71) Applicant: Veritas US IP Holdings LLC, Mountain View, CA (US)

(72) Inventors: Gaurav Makin, Shoreview, MN (US); John Kjell, Forest Lake, MN (US); Kody Kantor, Saint Paul, MN (US); Bruce R. Montague, Santa Cruz, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 209 days.

(21) Appl. No.: 15/014,046

(22) Filed: Feb. 3, 2016

(51) Int. Cl.
*H04L 29/08* (2006.01)
*H04L 12/707* (2013.01)

(52) U.S. Cl.
CPC .......... *H04L 67/1095* (2013.01); *H04L 45/22* (2013.01); *H04L 67/1097* (2013.01)

(58) Field of Classification Search
CPC . H04L 67/1095; H04L 45/22; H04L 67/1097; H04L 67/1002; H04L 67/34; H04L 67/142; H04L 67/327; G06F 9/45558; G06F 3/067; G06F 2009/45579; G06F 16/13; G06F 3/064; H04W 4/50
See application file for complete search history.

(56) References Cited

U.S. PATENT DOCUMENTS

| | | | |
|---|---|---|---|
| 7,620,753 B1* | 11/2009 | Beaman | G06F 9/526 710/52 |
| 2006/0288047 A1* | 12/2006 | Chron | G06F 16/162 |
| 2012/0088584 A1* | 4/2012 | Mamtani | H04N 21/233 463/42 |
| 2012/0192207 A1* | 7/2012 | Kashyap | G06F 9/544 719/319 |
| 2013/0212577 A1* | 8/2013 | Nayak | H04L 67/16 718/1 |

(Continued)

OTHER PUBLICATIONS

Brian Witten, et al; Systems and Methods for Preventing Code from Executing on Untrustworthy Platforms; U.S. Appl. No. 14/736,323, filed Jun. 11, 2015.

(Continued)

*Primary Examiner* — Sargon N Nano
(74) *Attorney, Agent, or Firm* — FisherBroyles LLP

(57) ABSTRACT

The disclosed computer-implemented method for rerouting data sent between application containers and storage containers may include (1) identifying an application container, a storage container that stores data for the application container, and a host that hosts both the application container and the storage container, (2) configuring the application container and the storage container to share a namespace on the host, (3) creating, within the shared namespace on the host, a resource that enables the application container and the storage container to share data, and (4) rerouting at least one item of data sent between the application container and the storage container to pass through the resource in the shared namespace rather than through a kernel of the host. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2016/0182315 A1* | 6/2016 | Salokanto | ............ | H04L 41/5054 |
| | | | | 709/226 |
| 2016/0266917 A1* | 9/2016 | Emelyanov | ............ | G06F 9/4555 |
| 2016/0373327 A1* | 12/2016 | Degioanni | ............ | H04L 41/0803 |
| 2016/0381058 A1* | 12/2016 | Antony | ............... | H04L 63/1425 |
| | | | | 726/23 |
| 2018/0129821 A1* | 5/2018 | Havewala | ............. | G06F 3/0644 |
| 2018/0293394 A1* | 10/2018 | Gunda | ................ | G06F 21/6209 |
| 2018/0307537 A1* | 10/2018 | Chen | ..................... | G06F 9/5016 |
| 2018/0357068 A1* | 12/2018 | Ambichl | ................. | G06F 9/445 |
| 2018/0357447 A1* | 12/2018 | Chen | ................... | G06F 21/6254 |
| 2018/0359338 A1* | 12/2018 | Vyas | ..................... | H04L 67/327 |

OTHER PUBLICATIONS

"OpenFlame", http://www.symantec.com/connect/downloads/openflame, as accessed Jan. 4, 2016, Symantec Connect, (May 28, 2015).

"Namespaces(7)", http://man7.org/linux/man-pages/man7/namespaces.7.html, as accessed Jan. 4, 2016, Linux Programmer's Manual, (Feb. 9, 2013).

"Circular buffer", https://en.wikipedia.org/wiki/Circular_buffer, as accessed Jan. 4, 2016, Wikipedia, (Dec. 15, 2005).

"POSIX", https://en.wikipedia.org/wiki/POSIX, as accessed Jan. 4, 2016, Wikipedia, (Dec. 19, 2003).

* cited by examiner

SYSTEMS AND METHODS FOR REROUTING DATA SENT BETWEEN APPLICATION CONTAINERS AND STORAGE CONTAINERS

BACKGROUND

In the past, large scale computing projects were limited to individuals and enterprises that owned large physical data centers with towering racks of computers. Now, distributed computing allows anyone with the resources to buy server space to run as many instances of their preferred computing device as desired. Further efficiency improvements have been introduced in the form of application containers that allow administrators to run applications without requiring the resources necessary to simulate an entire virtualized operating system for each virtualized application. Containers reduce the processing requirements for each application, allowing greater numbers of applications to be run on the same host. However, an increased number of applications running on a host means a corresponding increase in demand on other host resources, such as storage space and the processing resources needed to manage input/output (I/O) requests between applications and storage.

Traditional systems for managing application containers may be designed with little consideration for efficiency in regards to storage or storage I/O. Accordingly, the instant disclosure identifies and addresses a need for additional and improved systems and methods for rerouting data sent between application containers and storage containers.

SUMMARY

As will be described in greater detail below, the instant disclosure describes various systems and methods for rerouting data sent between application containers and storage containers by transferring the data through a resource in user space in order to avoid the additional overhead of sending the data through kernel space.

In one example, a computer-implemented method for rerouting data sent between application containers and storage containers may include (1) identifying an application container, a storage container that stores data for the application container, and a host that hosts both the application container and the storage container, (2) configuring the application container and the storage container to share a namespace on the host, (3) creating, within the shared namespace on the host, a resource that enables the application container and the storage container to share data, and (4) rerouting at least one item of data sent between the application container and the storage container to pass through the resource in the shared namespace rather than through a kernel of the host.

In some examples, the computer-implemented method may further include identifying a write request initiated by the application container to write data to the storage container and rerouting the data may include rerouting the write request sent from the application container to the storage container. In other examples, the computer-implemented method may further include identifying a read request initiated by the application container to read data from the storage container and rerouting the data may include rerouting the data sent from the storage container to the application container in response to the read request.

In some embodiments, rerouting the data may include intercepting a message that includes the data. In one embodiment, intercepting the message may include using at least one library function to intercept the message.

In one embodiment, the resource may include a data structure in shared memory that is accessible by both the application container and the storage container. Additionally or alternatively, the resource may include an inter-process communication socket.

In one embodiment, a system for implementing the above-described method may include (1) an identification module, stored in memory, that identifies an application container, a storage container that stores data for the application container, and a host that hosts both the application container and the storage container, (2) a configuration module, stored in memory, that configures the application container and the storage container to share a namespace on the host, (3) a creation module, stored in memory, that creates, within the shared namespace on the host, a resource that enables the application container and the storage container to share data, (4) a rerouting module, stored in memory, that reroutes at least one item of data sent between the application container and the storage container to pass through the resource in the shared namespace rather than through a kernel of the host, and (5) at least one physical processor configured to execute the identification module, the configuration module, the creation module, and the rerouting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify an application container, a storage container that stores data for the application container, and a host that hosts both the application container and the storage container, (2) configure the application container and the storage container to share a namespace on the host, (3) create, within the shared namespace on the host, a resource that enables the application container and the storage container to share data, and (4) reroute at least one item of data sent between the application container and the storage container to pass through the resource in the shared namespace rather than through a kernel of the host.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
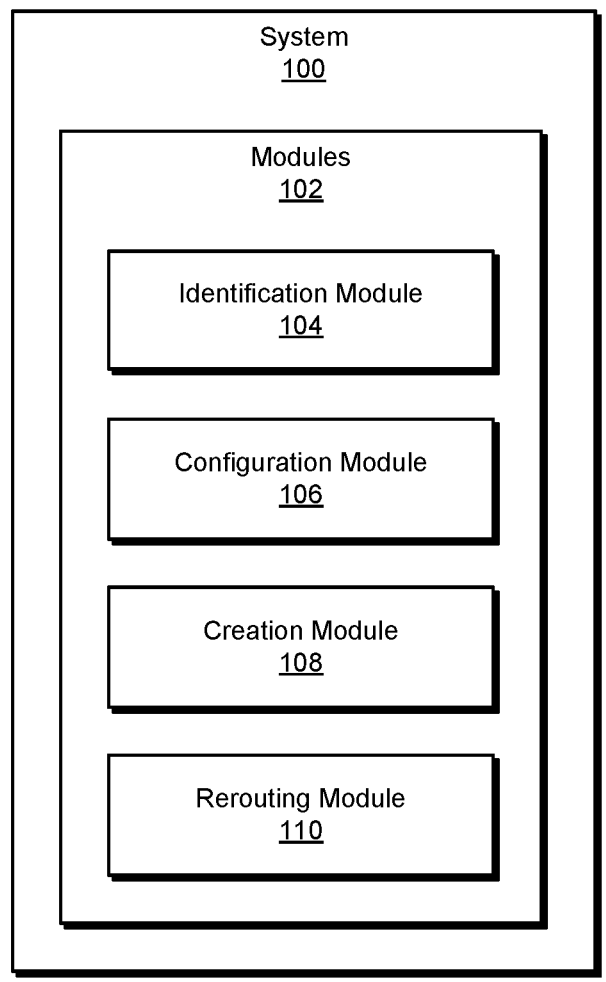
FIG. 1 is a block diagram of an exemplary system for rerouting data sent between application containers and storage containers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for rerouting data sent between application containers and storage containers. As will be explained in greater detail below, by intercepting messages between the application container and the storage container and rerouting those messages through a resource in a shared namespace rather than through kernel space, the systems and methods described herein may enable application containers and storage containers to communicate more efficiently, freeing up resources on the host.

The following will provide, with reference to FIGS. 1, 2, 4, and 5, detailed descriptions of exemplary systems for rerouting data sent between application containers and storage containers. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for rerouting data sent between application containers and storage containers. As illustrated in this figure, exemplary system 100 may include one or more modules 102 for performing one or more tasks. For example, and as will be explained in greater detail below, exemplary system 100 may include an identification module 104 that identifies an application container, a storage container that stores data for the application container, and a host that hosts both the application container and the storage container. Exemplary system 100 may additionally include a configuration module 106 that configures the application container and the storage container to share a namespace on the host. Exemplary system 100 may also include a creation module 108 that creates, within the shared namespace on the host, a resource that enables the application container and the storage container to share data. Exemplary system 100 may additionally include a rerouting module 110 that reroutes at least one item of data sent between the application container and the storage container to pass through the resource in the shared namespace rather than through a kernel of the host. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
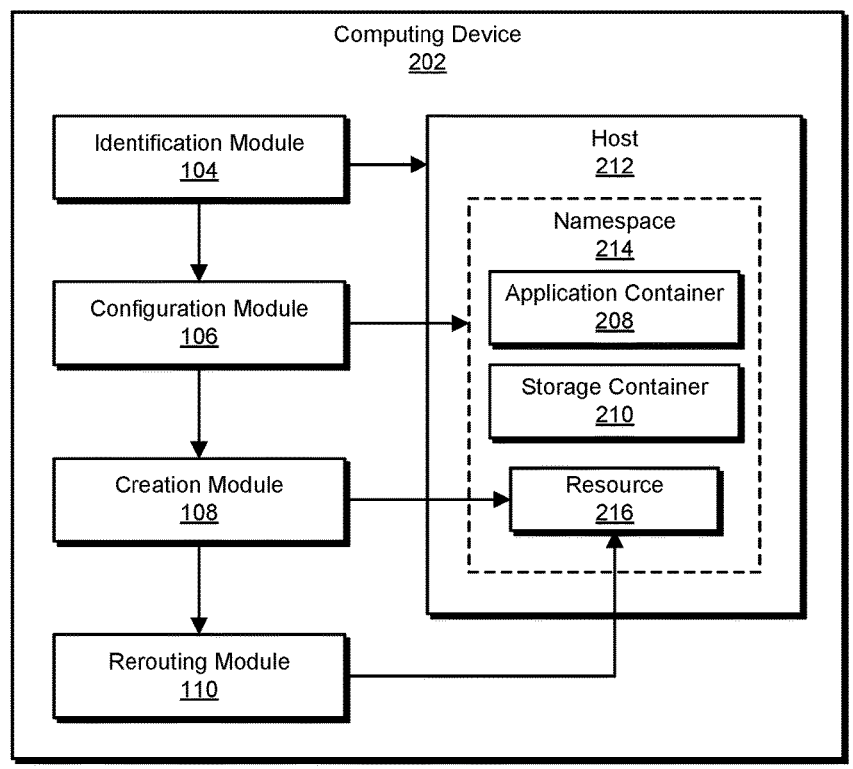
FIG. 2 is a block diagram of an additional exemplary system for rerouting data sent between application containers and storage containers.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to reroute data sent between application containers and storage containers. For example, and as will be described in greater detail below, identification module 104 may identify an application container 208, a storage container 210 that stores data for application container 208, and a host 212 that hosts both application container 208 and storage container 210. Next, configuration module 106 may configure application container 208 and storage container 210 to share a namespace 214 on host 212. Before, afterwards, or simultaneously, creation module 108 may create, within shared namespace 214 on host 212, a resource 216 that enables application container 208 and storage container 210 to share data. At some later time, rerouting module 110 may reroute at least one item of data sent between application container 208 and storage container 210 to pass through resource 216 in shared namespace 214 rather than through a kernel of host 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device. In some embodiments, computing device 202 may represent an application server and/or database server configured to provide various database services and/or run certain software applications.

Figure 3:
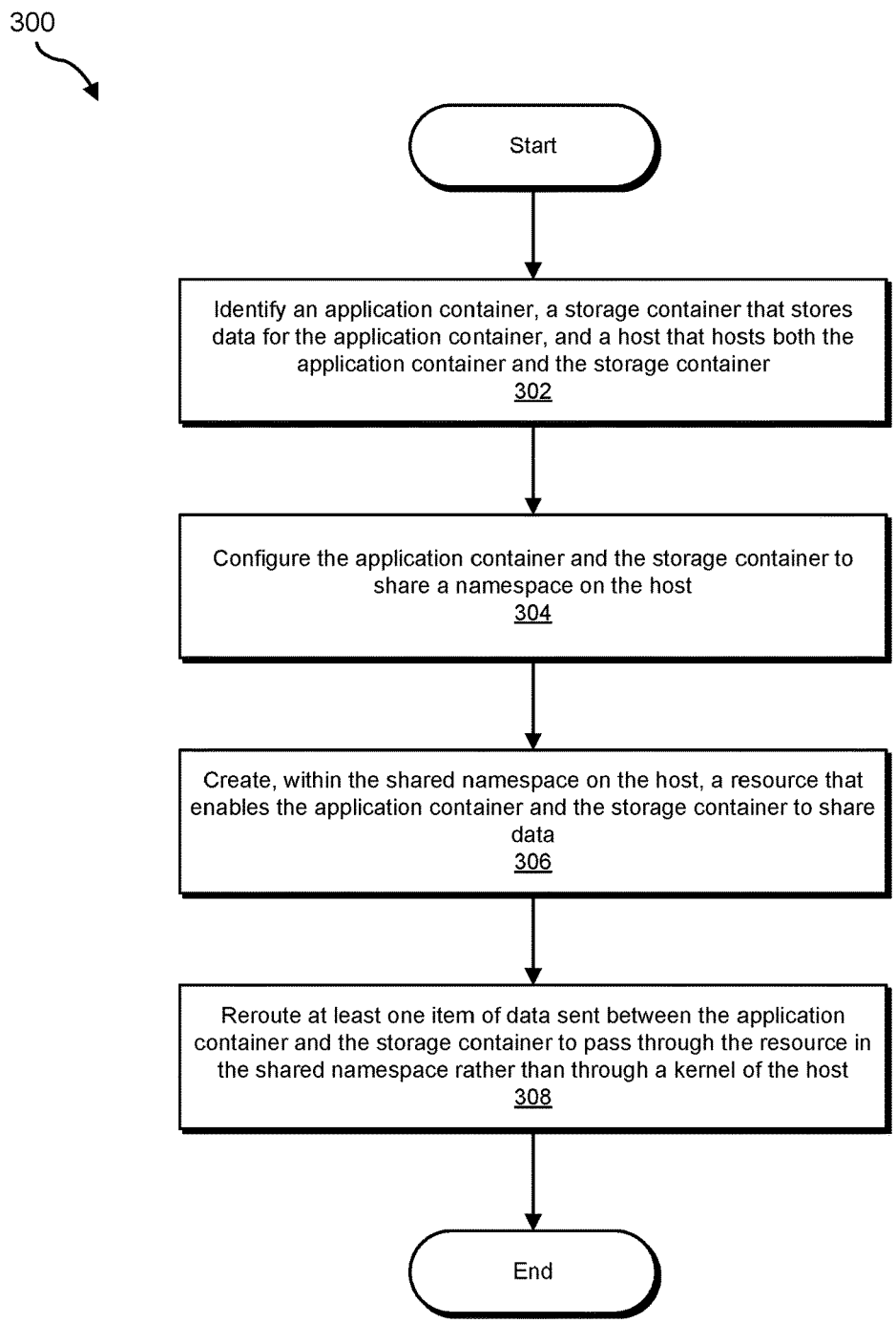
FIG. 3 is a flow diagram of an exemplary method for rerouting data sent between application containers and storage containers.

FIG. 3 is a flow diagram of an exemplary computer-implemented method 300 for rerouting data sent between application containers and storage containers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may identify an application container, a storage container that stores data for the application container, and a host that hosts both the application container and the storage container. For example, identification module 104 may, as part of computing device 202 in FIG. 2, identify application container 208, storage container 210 that stores data for application container 208, and host 212 that hosts both application container 208 and storage container 210.

The term "application container," as used herein, generally refers to any type of virtual environment that does not include an entire operating system but does include enough resources to execute at least one application. In some embodiments, the resources and/or processes within an application container may be isolated from resources and/or processes outside the application container and/or the application container may have a default configuration that specifies that communication from the application container to outside resources and/or processes must pass through the kernel of the application container's host.

The term "storage container," as used herein, generally refers to an area of memory designated as the storage space for an application container. In some embodiments, a storage container may include a software-defined storage container. In some examples, a storage container may function similarly to a folder in that the storage container may have a name and/or may contain folders and/or files.

The term "host," as used herein, generally refers to any computing system capable of hosting one or more application containers. In some embodiments, a host may include physical hardware. Additionally or alternatively, a host may include a virtualized computing system. In some embodiments, a host may be a remotely managed server (i.e., on the cloud).

Identification module 104 may identify the application container, the storage container, and/or the host in a variety of ways. For example, identification module 104 may create the application container and/or the storage container. In another example, identification module 104 may identify existing containers. In some embodiments, identification module 104 may be part of an application operating on the host. Additionally or alternatively, identification module 104 may be part of an application operating remotely.

At step 304, one or more of the systems described herein may configure the application container and the storage container to share a namespace on the host. For example, configuration module 106 may, as part of computing device 202 in FIG. 2, configure application container 208 and storage container 210 to share namespace 214 on host 212.

The term "namespace," as used herein, generally refers to any means of creating abstractions of global resources available on a host such that only certain processes can view and/or interact with the abstraction of the resource. In some embodiments, a namespace may be a LINUX namespace. In one embodiment, a namespace may be an inter-process communication (IPC) namespace.

Configuration module 106 may configure the application container and/or the storage container to share the namespace in a variety of contexts. In one embodiment, configuration module 106 may configure the application container and/or storage container to use the shared namespace before deployment of the application container and/or storage container to the host. In another embodiment, configuration module 106 may configure an existing application container and/or storage container to use the shared namespace.

At step 306, one or more of the systems described herein may create, within the shared namespace on the host, a resource that enables the application container and the storage container to share data. For example, creation module 108 may, as part of computing device 202 in FIG. 2, create, within the shared namespace 214 on host 212, resource 216 that enables application container 208 and storage container 210 to share data.

The term "resource," as used herein, generally refers to process, data structure, and/or object that may enable communication between an application container and a storage container. In one embodiment, the resource may include a data structure in shared memory that is accessible by both the application container and the storage container. For example, the resource may include a ring buffer (i.e., an array where the bottom element points to the top element). In another embodiment, the resource may include an IPC socket (i.e., an endpoint for exchanging data between processes) between the application container and the storage container.

Creation module 108 may create the resource in a variety of ways. For example, creation module 108 may designate an area in shared memory within the namespace to be a ring buffer. In another example, creation module 108 may create an IPC socket.

At step 308, one or more of the systems described herein may reroute at least one item of data sent between the application container and the storage container to pass through the resource in the shared namespace rather than through a kernel of the host. For example, rerouting module 110 may, as part of computing device 202 in FIG. 2, reroute at least one item of data sent between application container 208 and storage container 210 to pass through resource 216 in the shared namespace 214 rather than through a kernel of host 212.

The term "kernel," as used herein, generally refers to any part of a computing system's operating system that manages I/O requests from applications and/or translates I/O requests into instructions for various hardware components of a computing system such as a central processing unit.

Rerouting module 110 may reroute the data in a variety of ways. For example, rerouting module 110 may reroute the data by intercepting the message that includes the data in user space before the message reaches the kernel. In some embodiments, rerouting module 110 may use at least one library function to intercept the message. In one embodiment, rerouting module 110 may load a library which implements an application programming interface (API) for file system libraries by using LD_PRELOAD at the daemon level so that all the child processes (i.e., the application container and storage container) get hooked to the library. In one embodiment, the systems described herein may use the portable operating system interface (POSIX) API.

Figure 4:
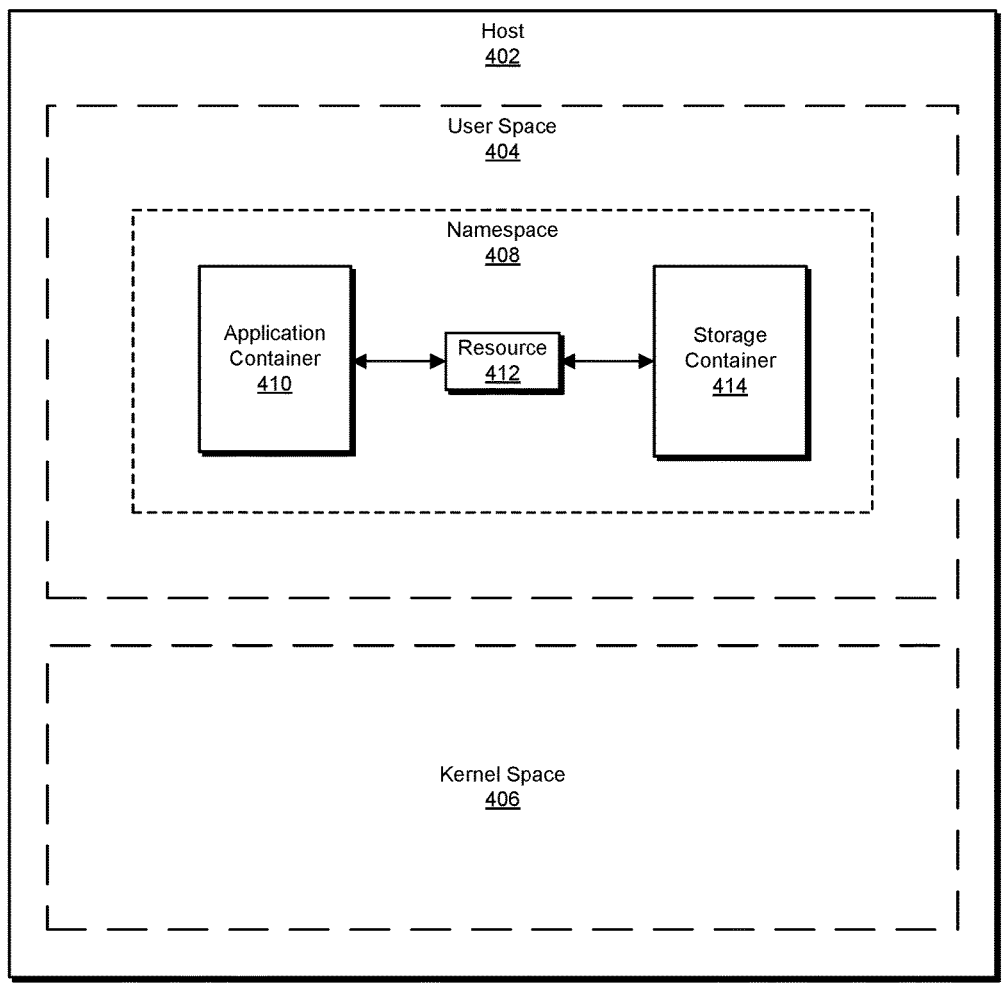
FIG. 4 is a block diagram of an exemplary computing system for rerouting data sent between application containers and storage containers.

In some embodiments, the application container, storage container, and resource may all be located in a namespace in user space, which may be separate from kernel space. For example, as illustrated in FIG. 4, a host 402 may include a user space 404 and a kernel space 406. In this embodiment, user space 404 may be the space on the host 402 dedicated to applications, processes, and/or resources outside the kernel of the operating system while kernel space 406 may be the space on host 402 designed for kernel operations. In this embodiment, user space 404 may contain a namespace 408. In some embodiments, host 402 may include multiple namespaces. In one example, namespace 408 may include an application container 410, a storage container 414, and/or a resource 412. In some examples, namespace 408 may include additional containers and/or resources. In other examples, namespace 408 may only include one matched set of an application container, a storage container, and a resource. In this example, rerouting module 110 may reroute messages between application container 410 and storage container 414 to pass through resource 412 and avoid kernel space 406 entirely.

In some examples, the systems described herein may identify a write request initiated by the application container to write data to the storage container. In these examples, rerouting module 110 may reroute the data by rerouting the write request sent from the application container to the storage container. For example, rerouting module 110 may record the data in the write request to a ring buffer accessible by the storage container.

In other examples, the systems described herein identify a read request initiated by the application container to read data from the storage container. In these examples, rerouting module 110 may reroute the data sent from the storage container to the application container in response to the read request. For example, rerouting module 110 may place the data sent by the storage container into a ring buffer accessible by the application container. In some embodiments, rerouting module 110 may also reroute the read requests. In other embodiments, rerouting module 110 may not reroute the read request.

Figure 5:
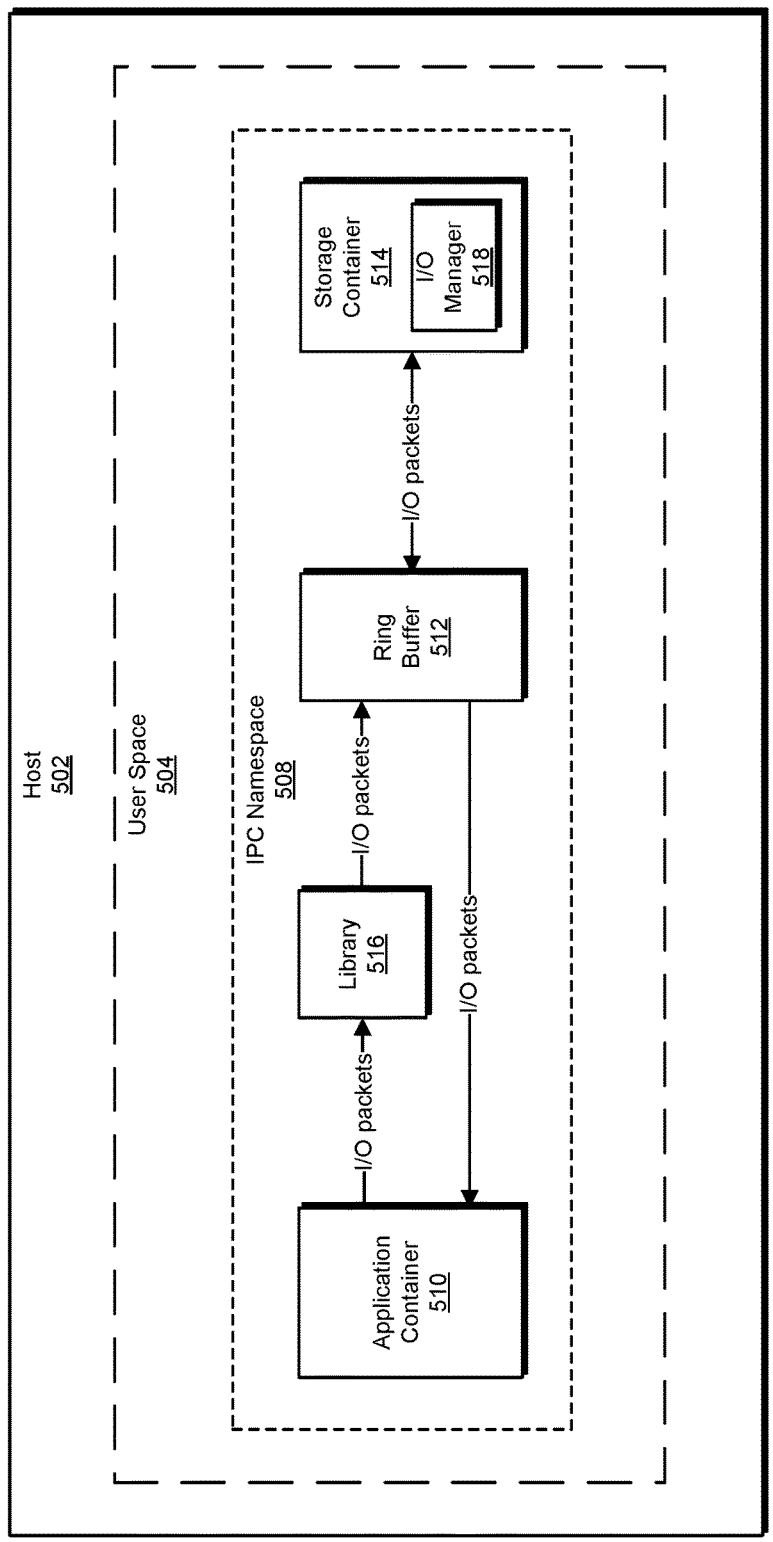
FIG. 5 is a block diagram of an exemplary computing system for rerouting data sent between application containers and storage containers.

In some embodiments, the systems described herein may use specific technology to reroute messages between application containers and storage containers. For example, as illustrated in FIG. 5, a host 502 may contain a user space 504 that may contain an IPC namespace 508. In one embodiment, an application container 510 may send I/O packets as part of a write request intended for a storage container 514 that may be intercepted by a library 516. In this example, library 516 may cause the I/O packets to be redirected to a ring buffer 512 and the data to be written to storage container 514 to be stored in buffer 512. Storage container 514, under the management of an I/O manager 518 (e.g., OPEN-FLAME), may retrieve data from ring buffer 512 and/or may store data to ring buffer 512 in response to read requests from application container 510. In some embodiments, application container 510 may receive data directly from ring buffer 512.

As described in connection with method 300 above, the systems and methods described herein may efficiently transfer I/O packets between application containers and storage containers. The systems described herein may configure both containers to share the IPC namespace, which allows for shared memory between containers. The systems described herein may then transfer the I/O packets between an application container and a storage container by using a ring buffer mechanism completely in the shared memory accessible by both containers. To enable this, the systems described herein may intercept the I/O packet in user space before the packets reach the kernel. To be able to intercept the I/O packets in user space from application container the systems described herein may load a library that implements the POSIX API and direct the I/O packet in a ring buffer to be processed by the storage container. In other embodiment, the systems described herein may direct I/O packets to another type of resource, such as an IPC socket. By efficiently transferring I/O packets from an application container to a software-defined storage container, the systems described herein may reduce the load on the host's storage and processing resources, enabling hosts to more efficiently run a greater number of application containers.

Figure 6:
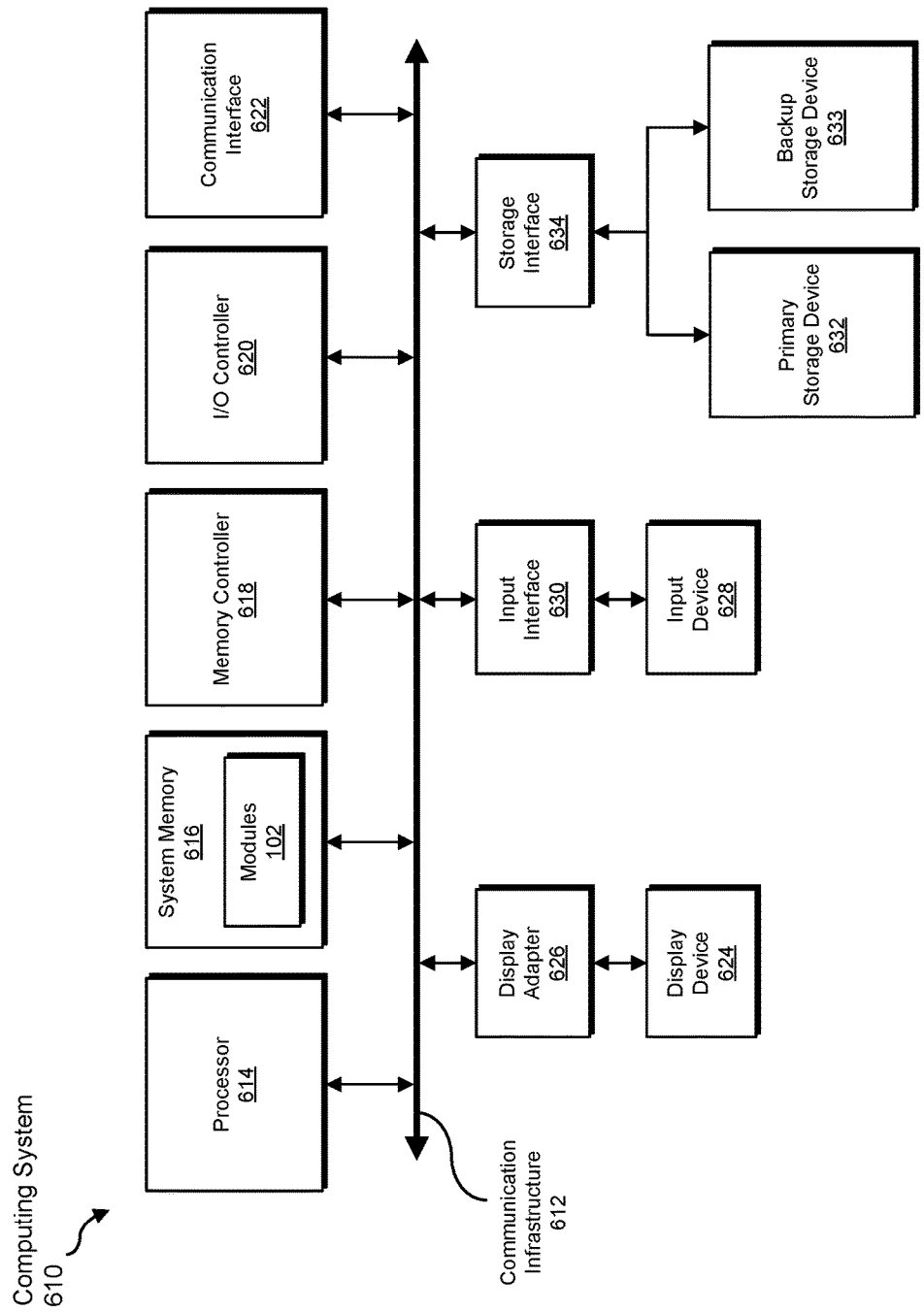
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an I/O controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
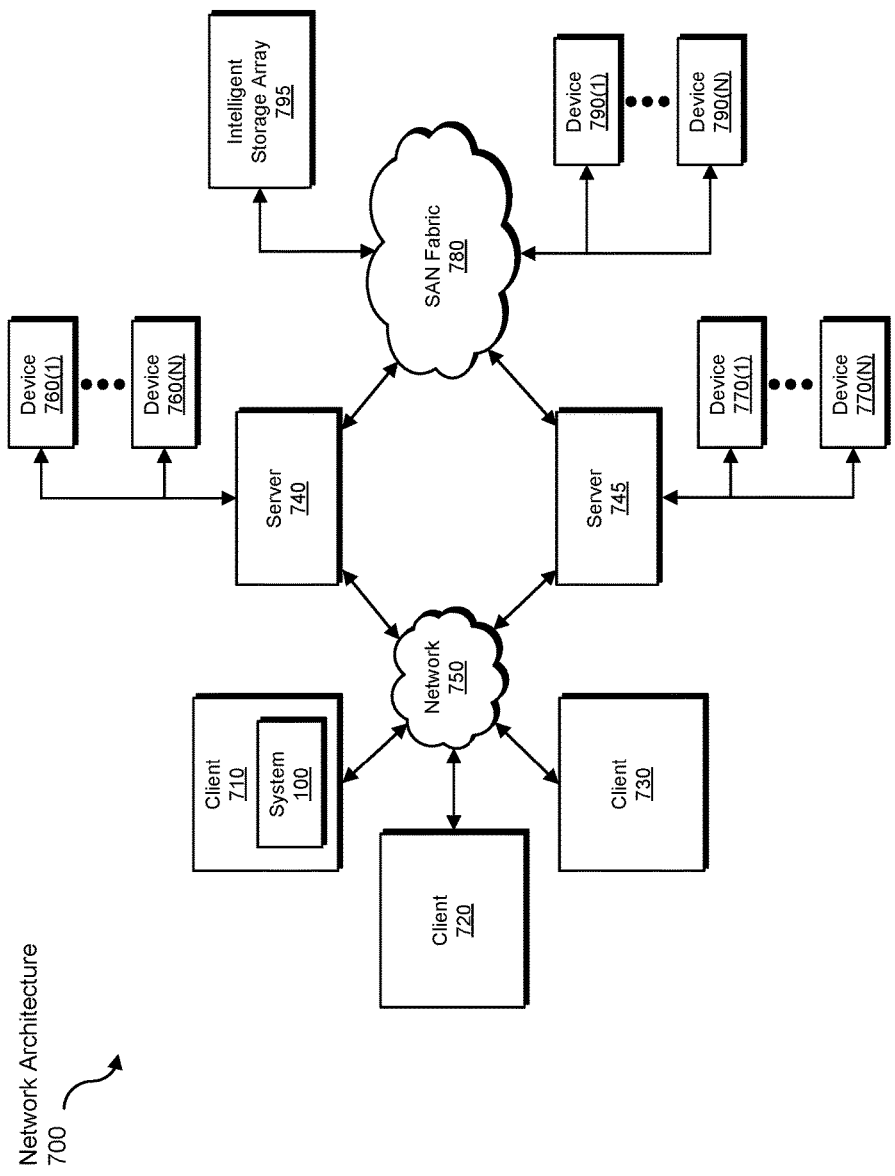
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for rerouting data sent between application containers and storage containers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive message data to be transformed, transform the message data into a message that can pass through a shared resource, output a result of the transformation to a shared resource, use the result of the transformation to enable communication between an application container and a storage container, and store the result of the transformation to the recipient of the message. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for rerouting data sent between application containers and storage containers, at least a portion of the method being performed by a computing device comprising at least one processor, the method comprising:

identifying an application container, a storage container that stores data for the application container, and a host comprising physical hardware that hosts both the application container and the storage container;

configuring the application container and the storage container to share a namespace on the host, wherein at least one of the application container or the storage container is configured to share the namespace before deployment to the host, and wherein the application container and the storage container are independent of any namespace prior to being configured to share the namespace on the host;
creating, within the shared namespace on the host, a resource that enables the application container and the storage container to share data;
rerouting at least one item of data sent between the application container and the storage container to pass through the resource in the shared namespace rather than through a kernel of the host by:
  loading a library that implements a library function comprising a portable operating system interface (POSIX) application programming interface (API) for a file system library, wherein the library is preloaded at a daemon level and hooks a plurality of child processes comprising the application container and the storage container to the library;
  intercepting, by the library function, the at least one item of data as part of a write request intended for the storage container, the at least one item of data comprising one or more input/output (I/O) packets; and
  redirecting, by the library, the I/O packets to a ring buffer accessible by the storage container, wherein the rerouting reduces a storage and hardware processing resource load on the host and enables the host to more efficiently run a greater number of application containers.

2. The computer-implemented method of claim 1, further comprising identifying a write request initiated by the application container to write data to the storage container;
wherein rerouting the at least one item of data comprises rerouting the write request sent from the application container to the storage container.

3. The computer-implemented method of claim 1, further comprising identifying a read request initiated by the application container to read data from the storage container;
wherein rerouting the at least one item of data comprises rerouting the data sent from the storage container to the application container in response to the read request.

4. The computer-implemented method of claim 1, wherein the resource comprises a data structure in shared memory that is accessible by both the application container and the storage container.

5. The computer-implemented method of claim 1, wherein the resource comprises an inter-process communication socket.

6. The computer-implemented method of claim 1, wherein the ring buffer comprises an array of elements including at least a top element and a bottom element.

7. The computer-implemented method of claim 6, wherein the bottom element in the array of elements points to the top element in the array of elements.

8. A system for rerouting data sent between application containers and storage containers, the system comprising:
an identification module, stored in memory, that identifies an application container, a storage container that stores data for the application container, and a host comprising physical hardware that hosts both the application container and the storage container;
a configuration module, stored in memory, that configures the application container and the storage container to share a namespace on the host, wherein at least one of the application container or the storage container is configured to share the namespace before deployment to the host, and wherein the application container and the storage container are independent of any namespace prior to being configured to share the namespace on the host;
a creation module, stored in memory, that creates, within the shared namespace on the host, a resource that enables the application container and the storage container to share data;
a rerouting module, stored in memory, that reroutes at least one item of data sent between the application container and the storage container to pass through the resource in the shared namespace rather than through a kernel of the host by:
  loading a library that implements a library function comprising a portable operating system interface (POSIX) application programming interface (API) for a file system library, wherein the library is preloaded at a daemon level and hooks a plurality of child processes comprising the application container and the storage container to the library;
  intercepting, by the library function, the at least one item of data as part of a write request intended for the storage container, the at least one item of data comprising one or more input/output (I/O) packets; and
  redirecting, by the library, the I/O packets to a ring buffer accessible by the storage container, wherein the rerouting reduces a storage and hardware processing resource load on the host and enables the host to more efficiently run a greater number of application containers;
at least one physical processor configured to execute the identification module, the configuration module, the creation module, and the rerouting module.

9. The system of claim 8, wherein:
the identification module identifies a write request initiated by the application container to write data to the storage container;
the rerouting module reroutes the at least one item of data by rerouting the write request sent from the application container to the storage container.

10. The system of claim 8, wherein:
the identification module identifies a read request initiated by the application container to read data from the storage container;
the rerouting module reroutes the at least one item of data by rerouting the data sent from the storage container to the application container in response to the read request.

11. The system of claim 8, wherein the resource comprises a data structure in shared memory that is accessible by both the application container and the storage container.

12. The system of claim 8, wherein the resource comprises an inter-process communication socket.

13. The system of claim 8, wherein the ring buffer comprises an array of elements including at least a top element and a bottom element.

14. The system of claim 13, wherein the bottom element in the array of elements points to the top element in the array of elements.

15. A non-transitory computer-readable medium comprising one or more computer-readable instructions that, when executed by at least one processor of a computing device, cause the computing device to:
identify an application container, a storage container that stores data for the application container, and a host comprising physical hardware that hosts both the application container and the storage container;

configure the application container and the storage container to share a namespace on the host, wherein at least one of the application container or the storage container is configured to share the namespace before deployment to the host, and wherein the application container and the storage container are independent of any namespace prior to being configured to share the namespace on the host;

create, within the shared namespace on the host, a resource that enables the application container and the storage container to share data;

reroute at least one item of data sent between the application container and the storage container to pass through the resource in the shared namespace rather than through a kernel of the host by:

loading a library that implements a library function comprising a portable operating system interface (POSIX) application programming interface (API) for a file system library, wherein the library is preloaded at a daemon level and hooks a plurality of child processes comprising the application container and the storage container to the library;

intercepting, by the library function, the at least one item of data as part of a write request intended for the storage container, the at least one item of data comprising one or more input/output (I/O) packets; and redirecting, by the library, the I/O packets to a ring buffer accessible by the storage container, wherein the rerouting reduces a storage and hardware processing resource load on the host and enables the host to more efficiently run a greater number of application containers.

16. The non-transitory computer-readable medium of claim 15, wherein the one or more computer-readable instructions cause the computing device to:

identify a write request initiated by the application container to write data to the storage container;

reroute the at least one item of data by rerouting the write request sent from the application container to the storage container.

17. The non-transitory computer-readable medium of claim 15, wherein the one or more computer-readable instructions cause the computing device to:

identify a read request initiated by the application container to read data from the storage container;

reroute the at least one item of data by rerouting the data sent from the storage container to the application container in response to the read request.

18. The non-transitory computer-readable medium of claim 15, wherein the resource comprises a data structure in shared memory that is accessible by both the application container and the storage container.

19. The non-transitory computer-readable medium of claim 15, wherein the ring buffer comprises an array of elements including at least a top element and a bottom element.

20. The non-transitory computer-readable medium of claim 19, wherein the bottom element in the array of elements points to the top element in the array of elements.

* * * * *